United States Patent
Laudet

(10) Patent No.: US 9,482,460 B2
(45) Date of Patent: Nov. 1, 2016

(54) TRUCK HAVING INTERMEDIATE HEAT EXCHANGING CIRCUIT BETWEEN CABIN AND CARGO CONTAINER

(75) Inventor: Frédéric Laudet, Vénissieux (FR)

(73) Assignee: Volvo Truck Corporation, Göteborg (SE)

( * ) Notice: Subject to any disclaimer, the term of this patent is extended or adjusted under 35 U.S.C. 154(b) by 408 days.

(21) Appl. No.: 13/885,420

(22) PCT Filed: Dec. 17, 2010

(86) PCT No.: PCT/IB2010/003464
§ 371 (c)(1),
(2), (4) Date: May 15, 2013

(87) PCT Pub. No.: WO2012/080771
PCT Pub. Date: Jun. 21, 2012

(65) Prior Publication Data
US 2013/0247605 A1 Sep. 26, 2013

(51) Int. Cl.
*B60H 1/32* (2006.01)
*F25D 11/00* (2006.01)
*B60H 1/00* (2006.01)

(52) U.S. Cl.
CPC ............ *F25D 11/003* (2013.01); *B60H 1/0025* (2013.01); *B60H 1/00257* (2013.01); *B60H 1/00264* (2013.01); *B60H 1/00378* (2013.01); *B60H 1/3232* (2013.01); *B60H 2001/00928* (2013.01)

(58) Field of Classification Search
CPC ............ B60H 1/0025; B60H 1/00257; B60H 1/00264; B60H 1/3232; B60H 1/00378; B60H 2001/00928; F25D 11/003

USPC .................. 62/244, 185, 96, 89, 99
See application file for complete search history.

(56) References Cited

U.S. PATENT DOCUMENTS

| 4,051,692 A | * | 10/1977 | Ku et al. ......................... 62/244 |
| 4,753,080 A | * | 6/1988 | Jones et al. ....................... 62/59 |
| 5,044,172 A | * | 9/1991 | Inoue et al. ...................... 62/335 |
| 5,386,709 A | * | 2/1995 | Aaron ............................. 62/199 |
| 5,908,069 A |   | 6/1999 | Baldwin et al. |
| 5,992,160 A | * | 11/1999 | Bussjager et al. ............... 62/79 |

(Continued)

FOREIGN PATENT DOCUMENTS

| DE | 10142546 A1 | 3/2003 |
| DE | 102007063248 A1 | 7/2009 |

(Continued)

OTHER PUBLICATIONS

International Search Report (Aug. 16, 2011) for corresponding International application No. PCT/IB2010/003464.

*Primary Examiner* — Orlando E Aviles Bosques
*Assistant Examiner* — David Teitelbaum
(74) *Attorney, Agent, or Firm* — WRB-IP LLP

(57) ABSTRACT

A truck includes a refrigerated compartment that is equipped with a dedicated refrigerating system, and a driver cabin. The driver cabin is equipped with a least a first heat exchanger adapted to cool an air flow directed to the cabin. The truck further includes a compartment heat exchanger located in the refrigerated compartment and adapted to cool a heat transfer liquid sent to the first heat exchanger through a heat transfer liquid connecting the first heat exchanger to the compartment heat exchanger.

12 Claims, 6 Drawing Sheets

(56) References Cited

U.S. PATENT DOCUMENTS

| | | | |
|---|---|---|---|
| 6,067,814 A * | 5/2000 | Imeland | 62/384 |
| 6,112,543 A * | 9/2000 | Feuerecker et al. | 62/430 |
| 7,614,242 B1 * | 11/2009 | Quesada Saborio | 62/77 |
| 2003/0014992 A1 * | 1/2003 | Grafton | 62/244 |
| 2004/0123976 A1 * | 7/2004 | Horn et al. | 165/42 |
| 2005/0198986 A1 * | 9/2005 | Allen | 62/244 |
| 2007/0175230 A1 * | 8/2007 | Plummer et al. | 62/236 |
| 2009/0211282 A1 * | 8/2009 | Nishimura | F24D 17/02 62/238.6 |

FOREIGN PATENT DOCUMENTS

| | | |
|---|---|---|
| EP | 0488553 A1 | 6/1992 |
| EP | 1653355 A2 | 5/2006 |

* cited by examiner

TRUCK HAVING INTERMEDIATE HEAT EXCHANGING CIRCUIT BETWEEN CABIN AND CARGO CONTAINER

BACKGROUND AND SUMMARY

The invention relates to a truck with a refrigerated compartment, equipped with a dedicated refrigerating system, and a driver cabin.

Many vehicles, including trucks are now equipped with air conditioning units which allow cooling down the air in the vehicle cabin. When trucks are stopped with the engine shut down, the driver of the truck cannot activate the air conditioning system of the truck if it is powered by the engine. Therefore, if the truck is parked in a warm place, the cabin of the truck can become uncomfortable for the driver. In any case, vehicle air conditioning units require a substantial amount of energy to cool down the cabin of a truck. This is even more true due to the fact that these refrigerating units need to be of a comparatively small size and should not be too expensive, so that in many cases their inherent efficiency is not optimum.

Trucks equipped with a refrigerated compartment, which can be mounted on the truck itself or in a trailer, are usually equipped with a refrigerating system dedicated to the refrigerated compartment. Due to the much bigger cooling power required for refrigerating the compartment, these refrigerating systems are usually much more bulky already than conventional vehicle air conditioning units. The vast majority of such refrigerating systems are of the vapor compression type where a refrigerant flows in closed cycle circuit comprising a compressor, a condenser, an expander and evaporator. Systems for refrigerating big compartments may comprise a dedicated internal combustion engine. Nevertheless, other systems exist which are based on an mere open loop expansion of pre-compressed fluid such as nitrogen or carbon dioxide store under high pressure in a dedicated reservoir, such as described in EP-1,653,355. In any case, the temperature of the refrigerated compartment is maintained at a substantially constant value, at any time, by the refrigerating system, which is independent from the air conditioning system of the cabin of the truck if the cabin is so equipped.

As the temperature of refrigerated compartments is much lower than the temperature required in the cabin for the comfort of the driver, the refrigerating system of the compartment can be used to control the temperature of the cabin without influencing too much the temperature in the refrigerated compartment. To this end, it is known from DE-A-101 42 546 to use a heat exchanger installed in the refrigerated compartment to refresh an air flow coming from the cabin. This refreshed air flow is then sent back and blown into the cabin. The system has a single air to air heat exchanger where the air of the cabin and the air of the refrigerated compartment can exchange heat. Such system may allow dispensing with a dedicated cabin refrigeration system.

This technique needs ducts of a large diameter running from the cabin to the refrigerated compartment to obtain enough air flow, which may prove to be not convenient when the refrigerated compartment is carried by a trailer or a semi-trailer which exhibits ample movements with respect to the cabin when the vehicle is operated. Moreover, the air/air heat exchanges do not provide a satisfying efficiency and carrying low thermal energies by air induces relatively high energy losses.

An aspect of this invention aims at proposing a new truck having a refrigerated compartment equipped with a dedicated refrigerating system and a driver cabin, which allows to efficiently use the refrigerating system to refresh the cabin when the air conditioning system of the cabin is deactivated due to the idle state of the engine of the truck.

To this end, an aspect of the invention concerns a truck with a refrigerated compartment equipped with a dedicated compartment refrigerating system and a driver cabin. This truck is characterized in that the driver cabin is equipped with a least a first heat exchanger adapted to cool an air flow directed to the cabin, and wherein it comprises a compartment heat exchanger located in the refrigerated compartment and adapted to cool a heat transfer liquid sent to the first heat exchanger through a heat transfer liquid circuit connecting said first heat exchanger to said compartment heat exchanger.

Thanks to an aspect of the invention, a heat transfer liquid is cooled in the refrigerated compartment and driven to a heat exchanger installed in the cabin, in order to refresh the temperature of the cabin, for example in case an air conditioning system of the cabin does not operate, in case it is more efficient to use only the compartment refrigerating system than a cabin refrigerating system, or simply in case the cabin is devoid of any air conditioning system. The use of a heat transfer liquid induces a high heat transfer efficiency in both the first heat exchanger and the compartment heat exchanger, and small diameter hoses can be used to convey the liquid front the compartment to the cabin, which reduces the efficiency losses during the circulation of the heat transfer liquid.

According to further aspects of the invention which are advantageous but not compulsory, such a truck may incorporate one or several of the following features:

The heat transfer circuit comprises flexible hoses between the cabin and the refrigerated compartment.

The refrigerated compartment comprises a cold storage block thermally connected to the heat transfer liquid circuit.

The first heat exchanger is associated to a ventilation system of the cabin comprising several spaced apart air outlets.

The first heat exchanger is associated to a ventilation system which in installed inside a dashboard of the vehicle.

The first heat exchanger is associated to an auxiliary ventilation system installed in a living space of the cabin, and adapted to ventilate said living space.

The truck comprises a cabin dedicated air conditioning system adapted to cool an air flow directed to the cabin.

The air conditioning system of the cabin comprises an evaporator and the first heat exchanger and the evaporator are associated to a same ventilating system.

The air conditioning system of the cabin comprises an evaporator and a secondary heat transfer circuit having a secondary heat exchanger able to exchange heat with the evaporator, and wherein the first heat exchanger is connected to both the compartment heat exchange circuit and the secondary heat exchange circuit.

The truck comprises means to selectively connect the first heat exchanger to the compartment heat exchanger or to the secondary heat exchanger.

The means to selectively connect the first heat exchanger to the compartment heat exchanger or to the secondary heat exchanger comprise an electronic, control unit adapted to control valves means.

BRIEF DESCRIPTION OF THE DRAWINGS

The invention will now be explained in correspondence with the annexed figures and as an illustrative example, without restricting the invention. In the annexed figures.

DETAILED DESCRIPTION

Figure 1:
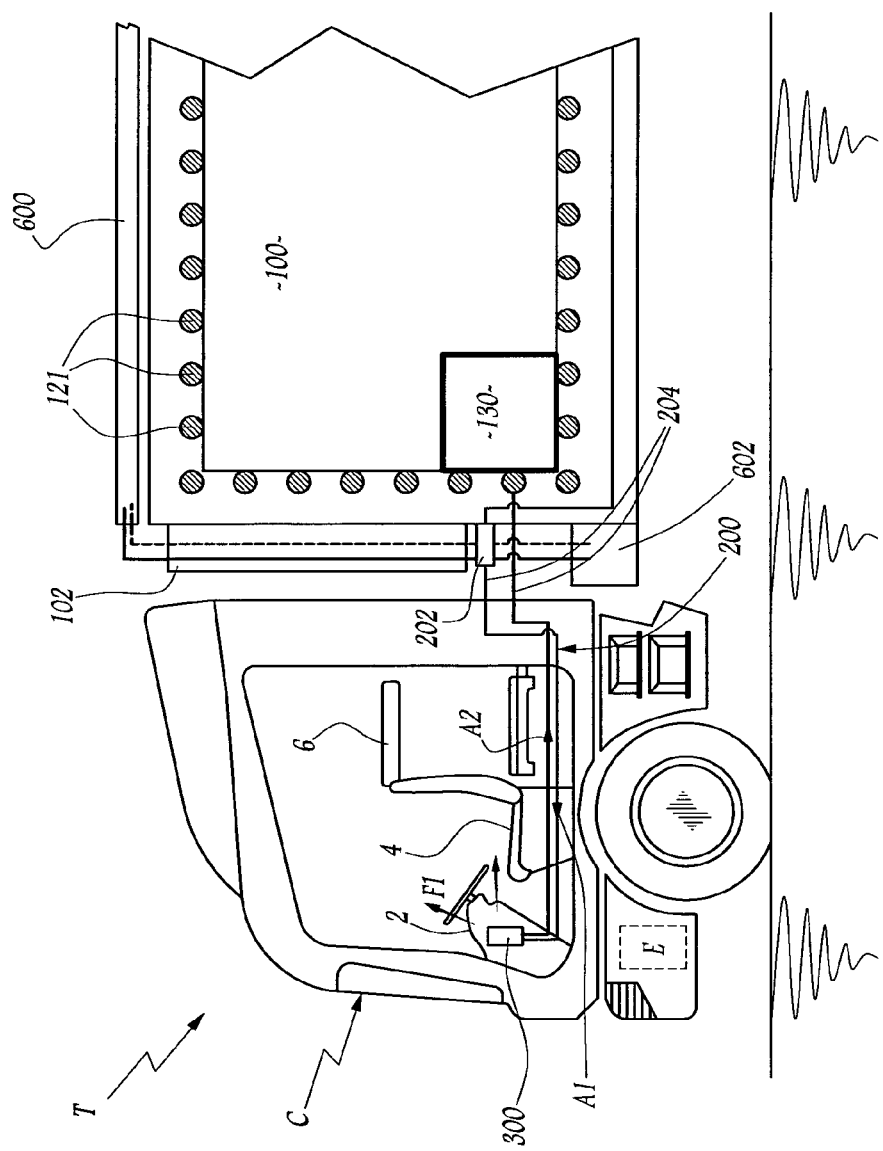
FIG. 1 is a schematic view of a truck according to a first embodiment of the invention.
Figure 3:
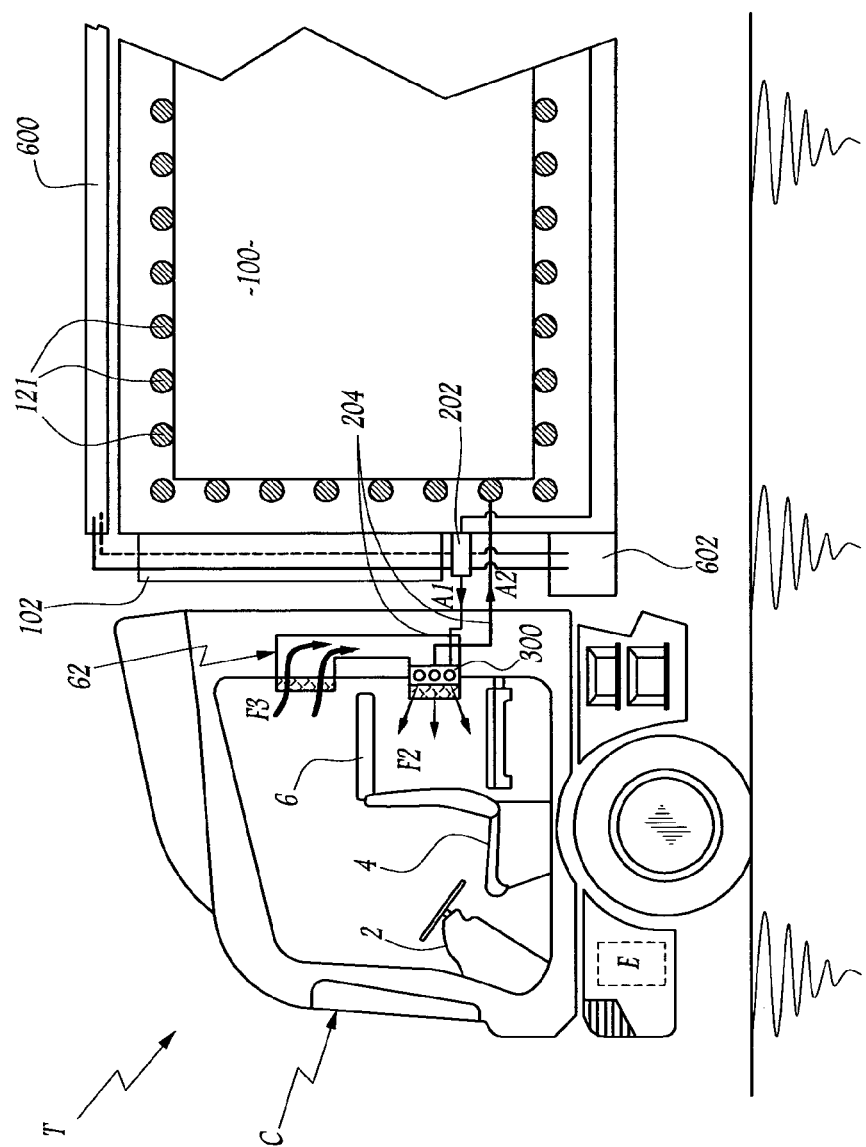
FIG. 3 is a schematic view of a truck according to a second embodiment of the invention.

As represented on FIGS. 1 and 3, a truck T according to the invention may comprise a cabin C comprising a dashboard 2 located in front of the cabin, substantially beneath the windshield, a driver seat 4, and a living space 6 located behind the driver seat, where a bed can be installed. Under cabin C, truck T comprises a chassis frame on which are mounted, inter alia, the wheels, the bumpers and an internal combustion engine E.

Truck T is equipped with a refrigerated compartment 100. Compartment 100 can be integrated onto truck T or installed on a trailer or a semi-trailer driven by truck T. Preferably, the compartment is entirely separate from the cabin so that no air may pass from one to the other. The compartment is for example for carrying goods which need to be maintained below a certain temperature. Refrigerated compartment 100 is equipped with a refrigerating system 102 adapted to maintain a desired temperature in refrigerated compartment 100.

Refrigerating system 102 may be of the vapour compression type comprising a closed loop refrigerating fluid circuit 104 which typically comprises a compressor 106, a condenser 108, a receiver-drier 110, an expander 112 and an evaporator 114. Evaporator 114 is used to cool an air flow blown into refrigerated compartment 100 so as to maintain its temperature at a desired level. Compressor 106 is for example driven by an internal combustion engine E100 dedicated to the operation of the compartment refrigerating system 102. In any case, the invention can be implemented whatever the type of the compartment refrigerating system.

Refrigerated compartment 100 comprises a compartment heat exchanger 120 which is installed at any place compartment 100 so as to extract cold from compartment 100. Compartment exchanger 120 may comprise a network of pipes 121 arranged around refrigerated compartment 100, for example along one or several walls thereof. Of course, more conventional types of exchangers could be used as the compartment heat exchanger 120. The compartment heat exchanger 120 is connected to, and part of, a heat transfer liquid circuit 200 which connects the compartment heat exchanger 120 to another heat exchanger, hereinafter named first heat exchanger, 300 which also part of the heat transfer liquid circuit 200 and which is preferably located in cabin C. Circulation of heat transfer liquid in circuit 200 can be driven by a pump 202. Heat transfer liquid goes along a closed loop in circuit 200, as shown by arrows A1 and A2. Arrow A1 represents heat transfer liquid flow from heat exchanger 120 to heat exchanger 300. Arrow A2 represents heat transfer liquid flow from heat exchanger 300 to heat exchanger 120. Heat transfer liquid circuit 200 crosses the gap between compartment 100 and cabin C thanks to flexible hoses 204. Cold is extracted from compartment 100 by cooling the heat transfer liquid which circulates in the compartment heat exchanger 120, the cold being thereby transferred to the first heat exchanger 300 for cooling an air how directed to the cabin.

Heat transfer liquid is preferably a liquid having good heat capacity and heat conductivity characteristics. Suitable candidates include water, ethylene glycol, linear alkenes, parraffinic hydrocarbons, aromatic hydrocarbons, etc. . . . . The heat transfer liquid preferably undergoes no phase change in the heat transfer liquid circuit 200.

In some embodiments, cabin C comprises a ventilation system 8 which preferably comprises, like in most vehicles, several spaced apart air outlets located at different places in the cabin to diffuse a ventilated air flow F1 more predominantly at different zones for performing a specific function, like defogging of the windscreen or of lateral windows, and/or for a better comfort of the driver and passengers, such as for directing air towards the feet of the driver/passenger. In most cases, the ventilation system is installed at least partly in the dashboard 2. A ventilation system will typically comprise one or several air ducts for feeding the air outlets, and a blower for forcing an air flow through the system, possibly at different speeds. The ventilation system also preferably comprises an air distribution control system for selectively controlling which outlets or group of outlets are fed with the air flow. Ventilation system 8 can be controlled by the driver thanks to a non represented control device located on dashboard 2, adapted to communicate with an electronic control unit 500, which may be adapted to implement automatic or semiautomatic control of the system for example in terms of temperature or speed of the air flow, or in terms of selection of the outlets. The ventilation system can in most cases take air from outside the vehicle in order to bring in fresh air to the cabin, but it can also, as part of its distribution system, comprise means to cause air recycling where air is aspirated from the cabin to be redirected to the cabin through one or several of the outlets. In most cases, the ventilation system can be associated with a heater for heating the flow of air, or at least part of it, which is directed to the cabin through the ventilation system. The heater can be an electric resistor or can be a heat exchanger where the air flow F1 exchanges heat with the cooling liquid of an engine cooling circuit. Such heater is not represented in the drawings, but it could for example be integrated within a duct of the ventilation system 8.

As will be seen hereinafter, the ventilation system 8 may be associated with cooling means for cooling at least part of the flow F1.

Figure 2:
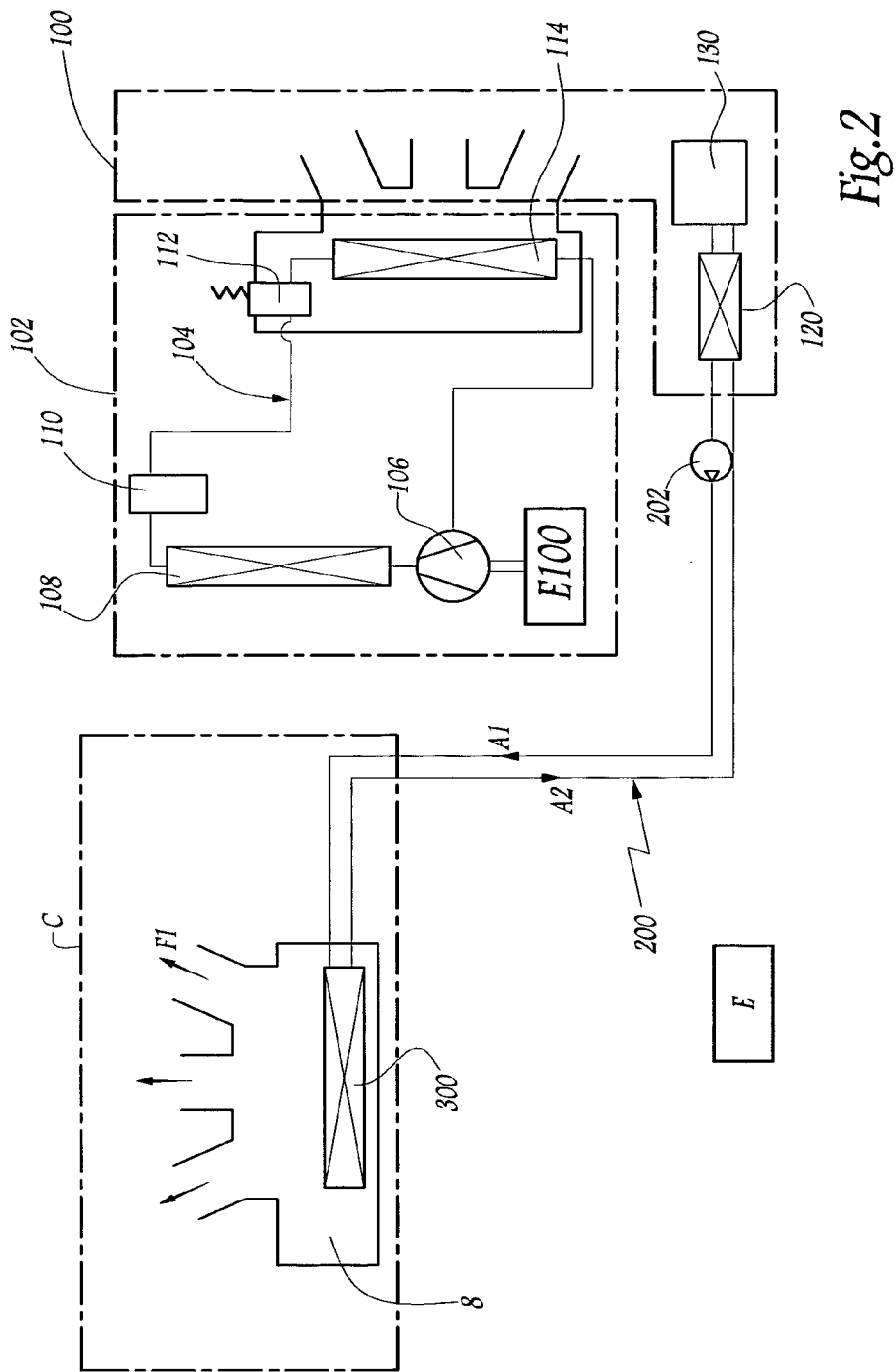
FIG. 2 is a fluid circulation chart of the truck of FIG. 1.

According to a first embodiment, the first heat exchanger 300 is associated with the ventilation system 8, and the cooling of the air flow F1 directed to the cabin C is exclusively provided by first heat exchanger 300. As schematically shown in FIGS. 1 and 2, the heat exchanger 300 may be integrated within a duct of the ventilation system 8 so that the air flow F1 blown into cabin C by ventilation system 8 is blown onto heat exchanger 300, in which the previously cooled heat transfer liquid circulates, in order to be cooled so that the driver gets the desired temperature in his cabin. The temperature of the cabin can be controlled by the driver by acting on heat exchanger 300, for example by increasing or decreasing the thermal exchange surface of heat exchanger 300, or by acting on the flow rate of cooled air in cabin C. The temperature control can also be implemented by piloting pump 202 so as to vary the flow rate of heat transfer liquid in circuit 200. These controls may be implemented by electronic control unit 500 thanks, for example, to electronic signals.

In the first embodiment, energy is not taken from main internal combustion engine E but from engine E100 of refrigerating system 102. As refrigerating system is commonly oversized so as to provide the desired temperature in refrigerated compartment 100 at any time, the energy needed to control the temperature in cabin C is substantially low with respect to the energy needs of refrigerating system 102. This architecture allows to spare energy taken from engine E and to provide the adequate temperature in cabin C even if engine E is stopped. In this first embodiment, the heat transfer circuit 200, with the first heat exchanger 300, may in most cases totally replace a conventional dedicated cabin refrigerating system, which can be dispensed with. Of course in such case, if the compartment refrigerating system is not functioning, or if the truck is a tractor which is not towing a refrigerated semi-trailer, then the cabin cannot receive cooled air.

In the following embodiments, elements similar to those of the first embodiment bear the same references.

Figure 4:
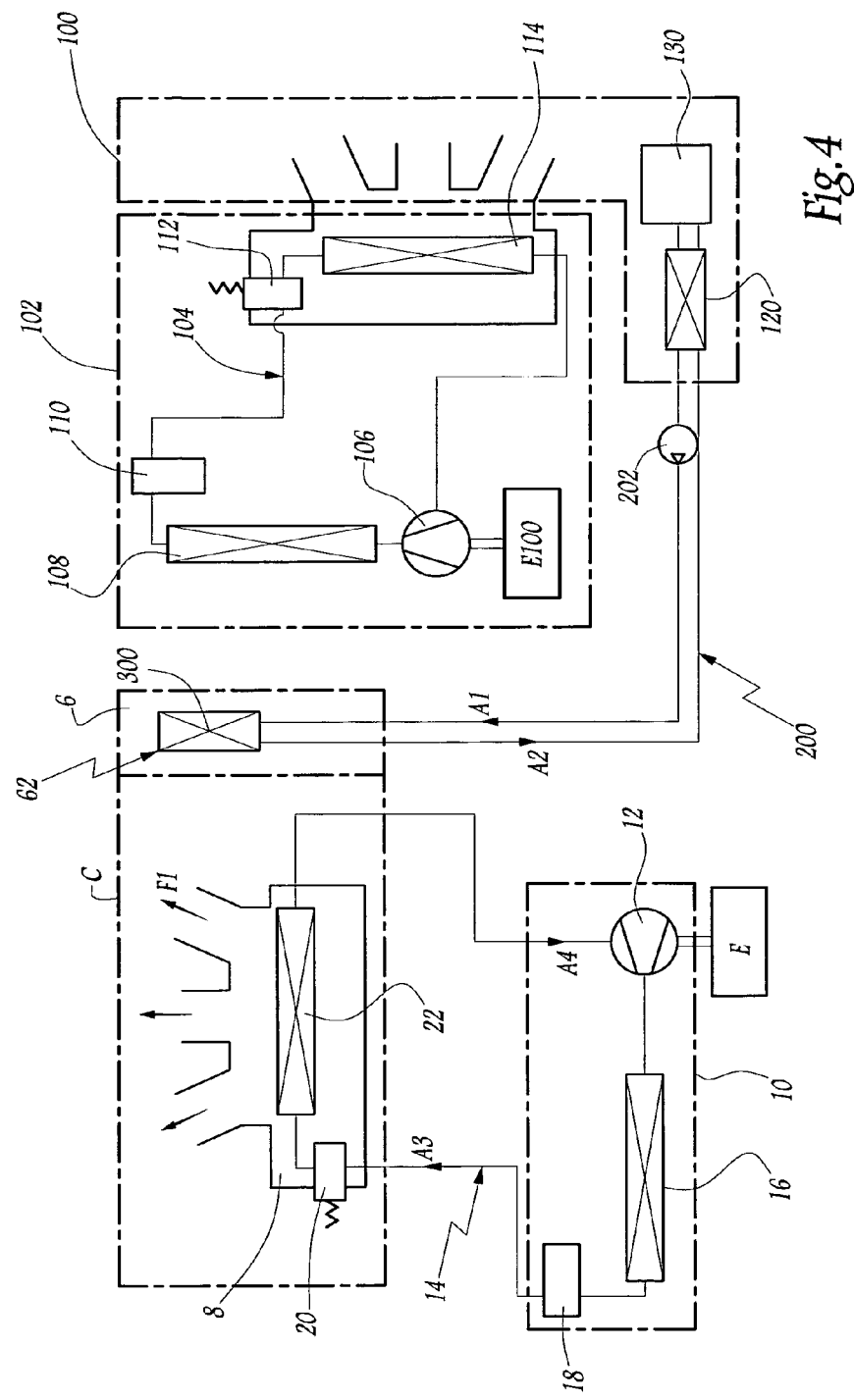
FIG. 4 is a fluid circulation chart of the truck of FIG. 3.

According to a second embodiment represented on FIGS. 3 and 4, the first heat exchanger 300 is mounted in the living space 6 of the cabin and is preferably associated with a second ventilation system 62 adapted to extract air from cabin C, as shown by arrows F3, and to blow an air flow F2 in living space 6. This provides the driver with comfortable resting conditions. Thanks to heat exchanger 300, when the driver rests or sleeps in living space 6, in a period when internal combustion engine E is shut down, temperature in living space 6 may be maintained at a comfortable level.

Figure 5:
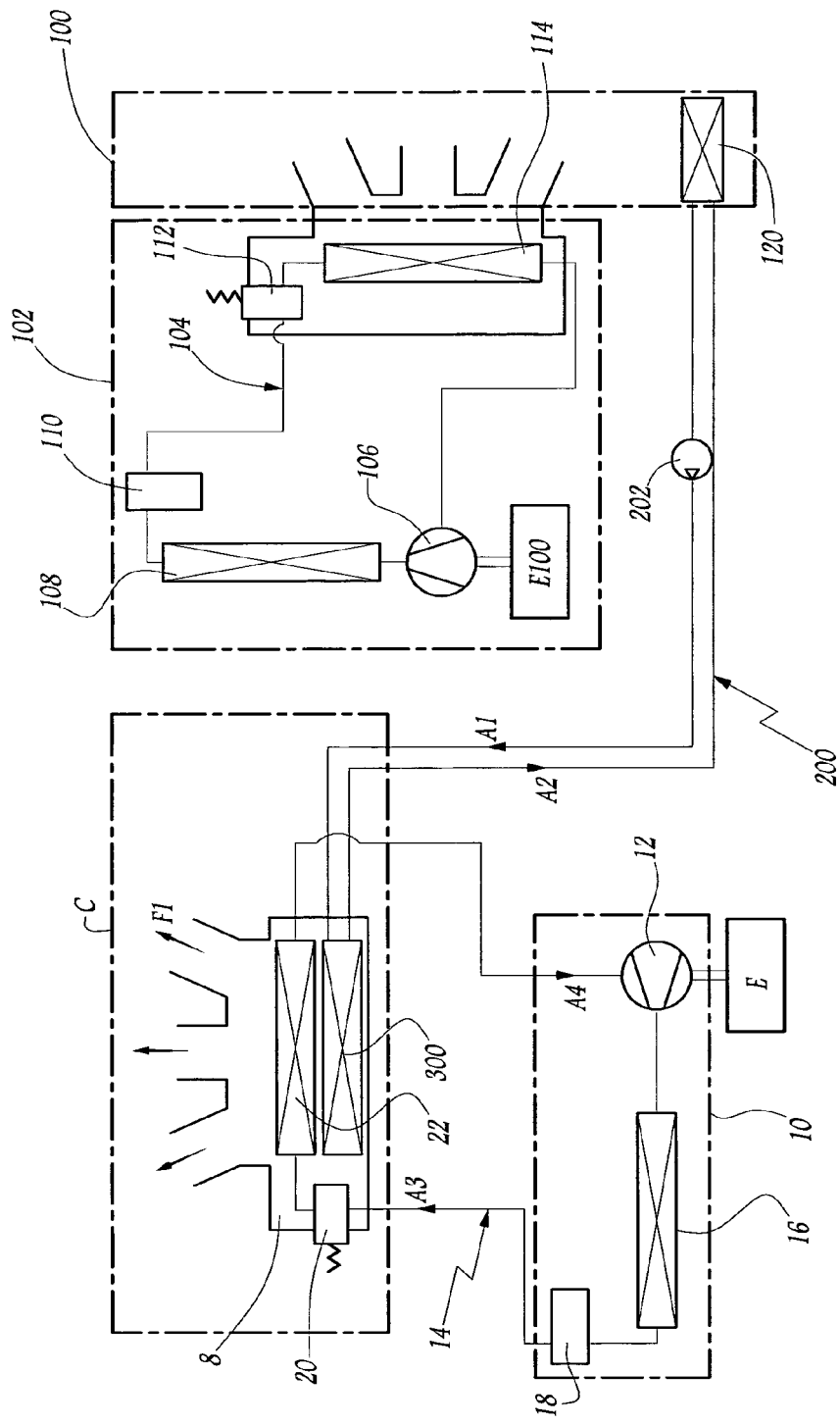
FIG. 5 is a fluid circulation chart of a truck according to a third embodiment of the invention.

In this second embodiment, truck T may be additionally equipped with an air conditioning system 10 dedicated to cabin C and independent from the compartment refrigerating system 102, for more specifically providing cooled air to a driver area which can be defined as the area substantially comprised between the dashboard, the windshield and the driving/passenger seat of cabin C. Air conditioning system 10 may be driven by internal combustion engine E, as shown, or by another source of power such as an electric motor. In a manner similar to refrigerating system 102, air conditioning system 10 may be based on a vapour compression cycle and may therefore comprise a refrigerating circuit 14 comprising a compressor 12 driven by engine E, a condenser 16, a receiver-dryer 18, an expander 20 and an evaporator 22. The refrigerating fluid which circulates in circuit 14 can be for example conventional R134a refrigerant or CO2. This refrigerating fluid circulates in closed loop in circuit 14, as shown by arrows A3 and A4, and undergoes phase changes. Arrow A3 represents refrigerating fluid flow from condenser 16 to evaporator 22. Arrow A4 represents refrigerating fluid flow from evaporator 22 to condenser 16. Evaporator 22 is adapted to cool air flow F1 in which is to be directed to the driver area of cabin C and it is therefore associated to ventilation system 8, for example by being integrated within an air duct of the ventilation system. According to a third embodiment represented on FIG. 5, the truck may be equipped with both a dedicated cabin air conditioning system as described in relation to the second embodiment, and with a first heat exchanger 300 according to the invention, i.e. connected to a compartment heat exchanger 120 in a heat transfer liquid circuit 200, with the first heat exchanger 300 and the evaporator of the dedicated cabin air conditioning system being associated to the same ventilation system 8. The common ventilation system is preferably at least partly installed in dashboard 2. In this embodiment, the cabin ventilation system 8 can deliver cooled air which may be cooled either by the evaporator, or by the first heat exchanger, or by both, depending on the operating states of the vehicle, so that in all circumstances the cabin can be cooled and in all circumstances the cooled air is delivered through the ventilation system which achieves an optimal distribution in the driver area of the cabin for optimum comfort. It can be noted that, when both the evaporator 22 and the first exchanger 300 deliver cold, the cooling effects are added, which can be an advantage in case of very warm weather.

Figure 6:
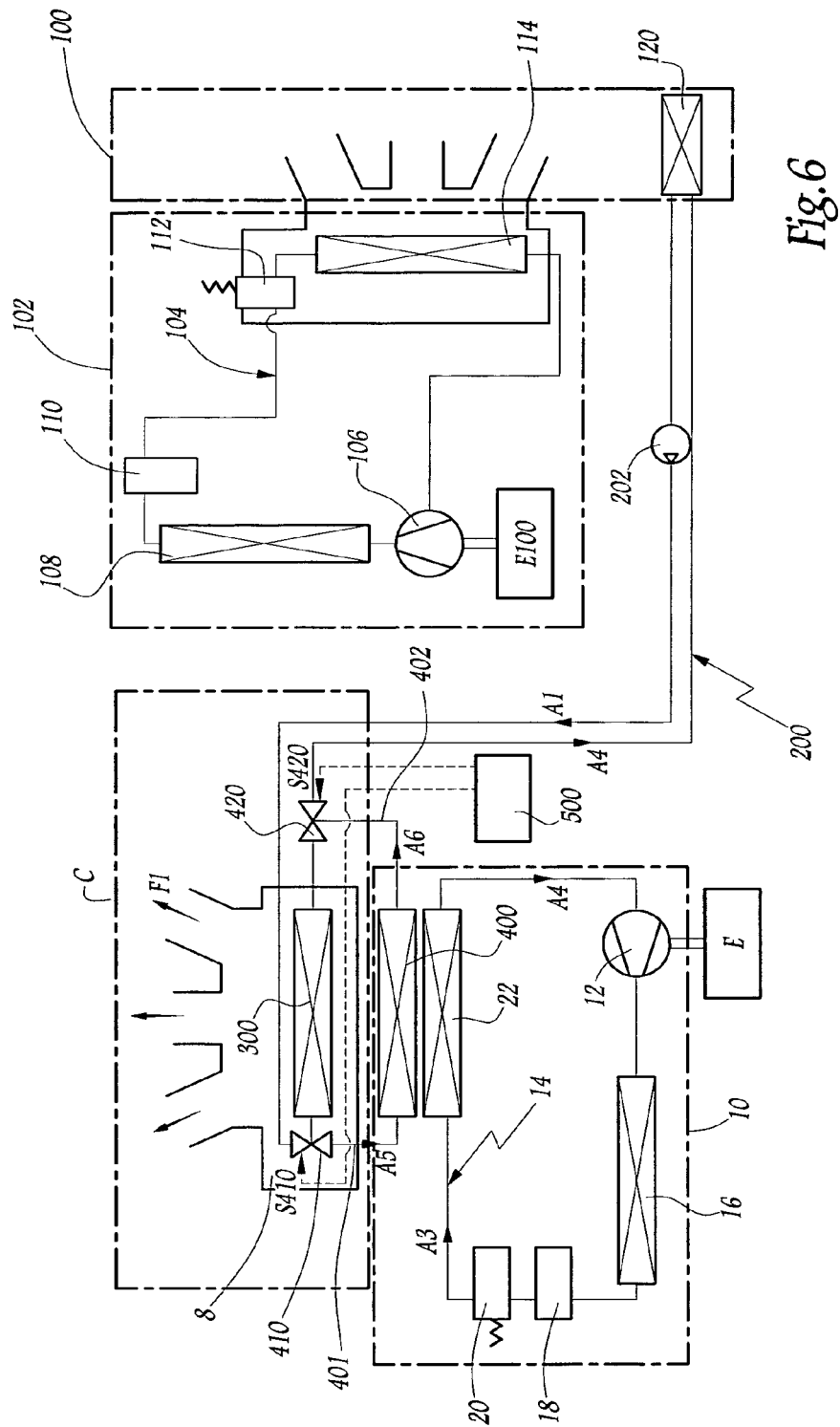
FIG. 6 is a fluid circulation chart of a truck according to a fourth embodiment of the invention.

According to a fourth embodiment represented on FIG. 6, the truck comprises a dedicated air conditioning system 10 of the cabin C having an evaporator 22. Contrary to the second and third embodiments, the evaporator is not directly in contact with the air flow F1 which is to be directed to the cabin. Instead, a secondary heat transfer circuit 401, 402 having a secondary heat exchanger 400 able to exchange heat with the evaporator 22 is provided, and the first heat exchanger 300 is connected to both the compartment heat exchange circuit 200 and the secondary heat exchange circuit so as to be part of both circuits. In both heat transfer circuits, a heat transfer fluid, preferably the same, flows to "bring cold" to the first heat exchanger 300 from the compartment heat exchanger 120 and/or from the secondary heat exchanger 400.

In parallel to being connected to compartment heat exchanger 120, the first heat exchanger 300 is connected to secondary heat exchanger 400 by two supplementary ducts 401 and 402. Heat exchanger 400 is therefore connected with liquid circuit 200. Means are provided to selectively connect the first heat exchanger 300 to the compartment heat exchanger 120 or to the secondary heat exchanger 400. For example, these means can be embodied as three-way valves 410 and 420. Three-way valves 410 and 420 are preferably controlled by electronic control unit 500 thanks to electronic signals S410 and S420.

The secondary heat exchanger 400 is coupled to evaporator 22 so as to permit heat exchanges between the refrigerating fluid flowing in the air conditioning circuit and the heat transfer liquid circulating in the secondary heat transfer circuit. Preferably, the secondary heat exchanger 400 and the evaporator are integrated into a single component so as to provide direct heat exchange between the refrigerant fluid and the heat transfer liquid, without mixing of the two.

The first heat exchanger is preferably associated to the ventilating system 8 which is at least partly installed in the dashboard of the vehicle.

In a first configuration, the first heat exchanger 300 can be disconnected from the secondary heat exchanger 400 by controlling valves 410 and 420 so as to achieve air conditioning in cabin C in the same manner as in the first embodiment. In this case, operating of compressor 12 can be deactivated so as to save energy.

In a second configuration, the first heat exchanger 300 and the secondary heat exchanger 400 are connected to each other and the first exchanger 300 is disconnected from the compartment heat exchanger 120 thanks to valves 410 and 420. In this case, the cabin air conditioning system 10 operates as usual and the cooling effect is obtained by the circulation of the heat transfer liquid in ducts 401 and 402. The heat transfer liquid circulates in closed loop between exchanger 300 and exchanger 400 through ducts 401 and 402, as shown by arrows A5 and A6. Arrow A5 represents heat transfer liquid flow from exchanger 300 to exchanger 400 and arrow A6 represents heat transfer liquid flow from exchanger 400 to exchanger 300. The circulation of the fluid can be maintained by a non-represented pump in this configuration. This setup allows having the evaporator 22 outside of the vehicle cabin.

Valves 410 and 420 can be controlled by an electronic control unit on the basis of the operating state of truck T, such as whether the compartment refrigerating system and the air conditioning system are operating or not.

In one variant of the fourth embodiment, the selective connecting means can connect the first heat exchanger simultaneously to both the compartment heat exchanger 120 and to the secondary heat exchanger 400 so as to allow a third configuration of the system where the first heat exchanger receives cooled liquid from both the cabin air conditioning system and the compartment refrigerating system.

In another variant of the fourth embodiment, the first heat exchanger 300 can exchange places with secondary heat 400. First heat exchanger 300 is then not necessarily in the cabin.

According to an optional feature of the invention which is represented only on FIGS. 1 and 2 but can be implemented with the various embodiments of the invention, refrigerated compartment 100 may be equipped with a cold storage block 130. This block 130 is used to create a cold area in compartment 100 when refrigerating system 102 is shut down. Cold storage block 130 is connected to liquid circuit 200 and can be charged when refrigerating system 102 is operating. Cold storage block 130 can be used to keep some cooling capacity available for the first heat exchanger for some time after the shutdown of the compartment refrigerating system 102. The cold storage box can comprise a significant volume of material having a high thermal capacity and/or exhibiting a Ugh specific melting heat such as the so-called "Phase-Change Materials" amongst which one can select paraffin or fatty acids for example.

The technical features of the embodiments of the invention can be combined in the scope of the invention.

According to a non shown embodiment of the invention, truck T can comprise several heat exchangers analogue to first heat exchanger 300, which are connected to heat transfer liquid circuit 200, and which may be located at various places of cabin C. For example, cabin C can comprise a heat exchanger associated to a ventilation system in the dashboard and another heat exchanger located in living space 6, both being connected to the compartment heat exchanger via the heat transfer liquid circuit 200.

According to an optional feature which can be implemented with the various embodiments of the invention and which is represented on FIGS. 1 and 3, truck T may be equipped with a photovoltaic generator 600 mounted on the roof of refrigerated compartment 100. Photovoltaic generator 600 provides electrical energy to pump 202 and is also adapted to charge an energy storage unit 602, which can be used to operate various electrical equipments of truck T.

The invention claimed is:

1. A truck comprising:
a refrigerated compartment, the refrigerated compartment being equipped with a dedicated refrigerating system,
a driver cabin, wherein the driver cabin is equipped with a least a first heat exchanger adapted to cool an air flow directed to the cabin,
a compartment heat exchanger located in the refrigerated compartment and adapted to cool a heat transfer liquid sent to the first heat exchanger through a compartment heat transfer liquid circuit in which the heat transfer liquid undergoes no phase change, the compartment heat transfer liquid circuit connecting the first heat exchanger to the compartment heat exchanger, and
a cabin dedicated air conditioning system adapted to cool the air flow directed to the driver cabin,
wherein the dedicated air conditioning system of the driver cabin comprises an evaporator and a secondary heat transfer circuit having a secondary heat exchanger coupled to the evaporator and able to exchange heat with the evaporator, and wherein the first heat exchanger is connected to both the compartment heat transfer liquid circuit and the secondary heat transfer circuit.

2. The truck according to claim 1, wherein the compartment heat transfer liquid circuit comprises flexible hoses between the driver cabin and the refrigerated compartment.

3. The truck according to claim 1, wherein the refrigerated compartment comprises a cold storage block connected to the compartment heat transfer liquid circuit.

4. The track according to claim 1, wherein the first heat exchanger is associated to a ventilation system of the driver cabin comprising several spaced apart air outlets.

5. The truck according to claim 4, wherein the first heat exchanger is integrated within a duct of the ventilation system.

6. The truck according to claim 1, wherein the first heat exchanger is associated to a ventilation system which is at least partly installed in a dashboard of the truck.

7. The truck according to claim 1, wherein the first heat exchanger is associated with an auxiliary ventilation system installed in a living space of the driver cabin, and adapted to ventilate the living space.

8. The truck according to claim 1, wherein the cabin dedicated air conditioning system of the driver cabin comprises the evaporator and in that the first heat exchanger and the evaporator are associated with a same ventilating system.

9. The truck according to claim 1, wherein the secondary heat exchanger and the evaporator are integrated into a single component so as to provide direct heat exchange between a refrigerant fluid of the cabin dedicated air conditioning system and the heat transfer liquid.

10. The truck according to claim 1, comprising means to selectively connect the first neat exchanger to the compartment heat exchanger or to the secondary heat exchanger.

11. The truck according to claim 10, wherein the means to selectively connect the first heat exchanger to the compartment heat exchanger or to the secondary heat exchanger comprise an electronic control unit adapted to control valve means.

12. The truck according to claim 1, comprising several first heat exchangers which are connected to the compartment heat transfer liquid circuit.

* * * * *